(No Model.)
H. L. WARNER.
PNEUMATIC TIRE.
No. 549,173. Patented Nov. 5, 1895.
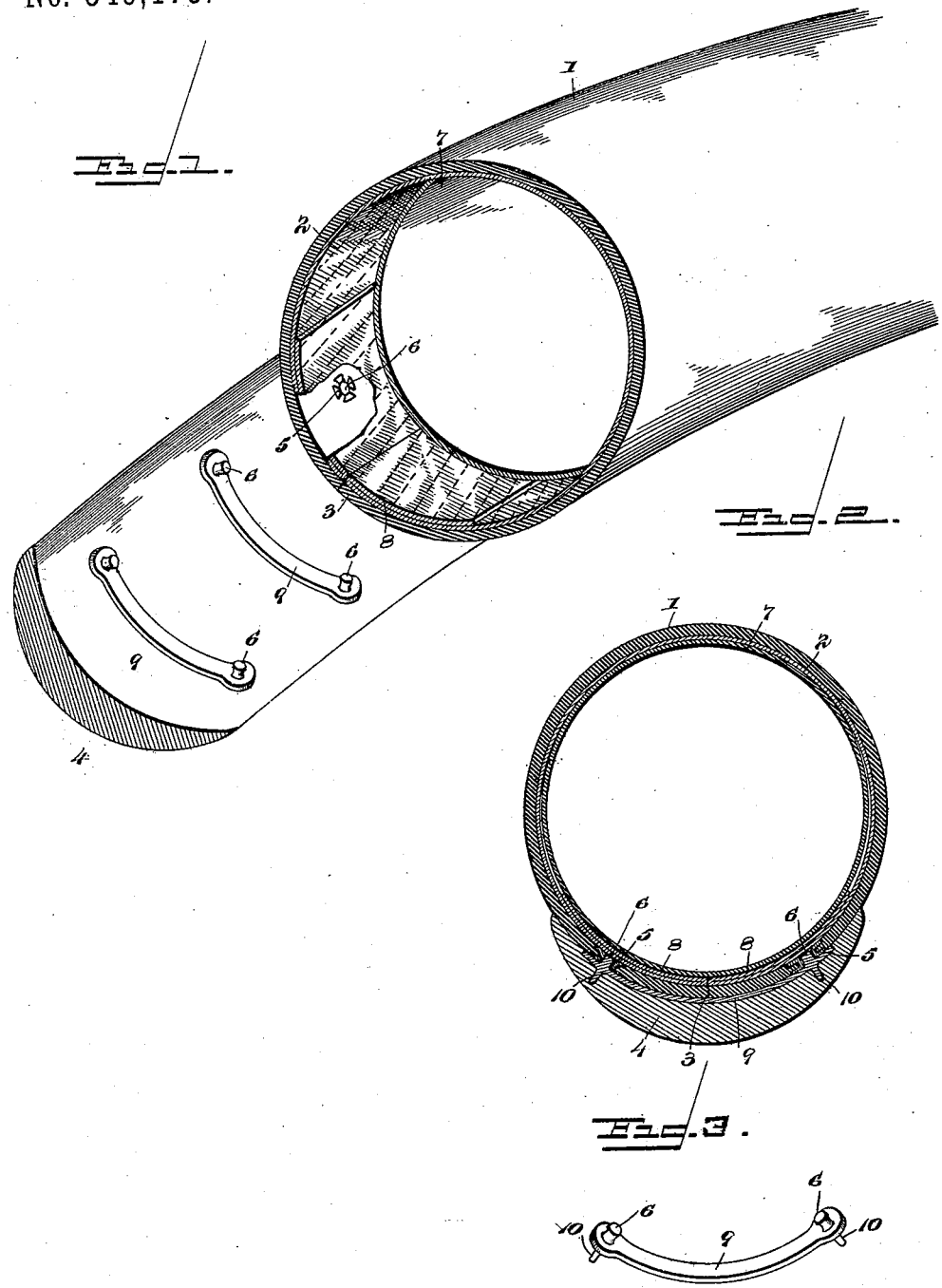
Witnesses
E. N. Stewart
J. F. Riley
Inventor
Hugh L. Warner
By his Attorneys,
C. A. Snow & Co.

UNITED STATES PATENT OFFICE.

HUGH L. WARNER, OF COVINGTON, KENTUCKY, ASSIGNOR OF ONE-HALF TO J. E. POORMAN, OF CINCINNATI, OHIO.

PNEUMATIC TIRE.

SPECIFICATION forming part of Letters Patent No. 549,173, dated November 5, 1895.

Application filed April 29, 1895. Serial No. 547,545. (No model.)

*To all whom it may concern:*

Be it known that I, HUGH L. WARNER, a citizen of the United States, residing at Covington, in the county of Kenton and State of Kentucky, have invented a new and useful Pneumatic Tire, of which the following is a specification.

The invention relates to improvements in pneumatic tires for bicycles.

The object of the present invention is to simplify and improve the construction of pneumatic bicycle-tires, and more particularly those employing inner tubes, and to provide one in which the outer tube will be firmly secured to the rim of the wheel and which will be adapted to have its outer tube readily removed when desired or detached at any particular point.

The invention consists in the construction and novel combination and arrangement of parts hereinafter more fully described, illustrated in the accompanying drawings, and pointed out in the claim hereto appended.

In the drawings, Figure 1 is a perspective view of a portion of a bicycle tire and rim constructed in accordance with this invention. Fig. 2 is a transverse sectional view. Fig. 3 is a detail perspective view of a pair of studs and their connecting-plate, such as shown in Figs. 1 and 2.

Similar numerals of reference designate corresponding parts in all the figures of the drawings.

1 designates an outer tube of a bicycle-tire provided with a smooth thin sheet of rubber arranged on the exterior and having two or more layers of cloth or fabric arranged within the sheet or layer of rubber, and these layers 2 are arranged with the warp of one at right angles to the warp of the other and with both their warps extending at an angle of forty-five degrees across the tire or rim, thereby allowing the outer tube to expand in size under pressure and at the same time to contract in length.

The inner edges 3 of the outer tube are arranged on the concave face of a crescent tire 4, with their adjacent longitudinal edges contiguous, and each longitudinal edge is provided with a series of eyelets 5, arranged at suitable intervals and adapted to be engaged by studs 6 of the rim. The inner tube 7 of the pneumatic tire is shielded from the inner ends of the eyelets by an inner layer of integral strip 8, formed by folding the material of which the outer tube is constructed inward over the eyelets, as clearly illustrated in the accompanying drawings, and the layers are vulcanized or otherwise connected firmly together and form practically a single piece of material.

The studs 6 are arranged in pairs and are preferably connected by a curved transversely-disposed plate 9 and have slightly concave inwardly-tapered projecting portions which fit into and interlock with the eyelets, and by making the projecting portions of the studs concaved or spool-shaped their holding power is greatly increased. The studs have inwardly-extending shanks 10, which form fastening devices on the inner faces of the transverse plates, and which are embedded in the rim.

By arranging the studs and eyelets in the manner shown the outer tube is firmly and detachably connected to the rim and may be readily removed at any part to expose the inner tube or for any other reason.

It will be seen that the tire is exceedingly simple and inexpensive in construction, that it is adapted to be readily applied to all kinds of bicycle-rims of whatever material the same may be constructed, and that it is adapted to be readily placed on and entirely or partially removed from the rim. It cannot blow off or out at any place, it cannot creep, slip, or rock on the rim, and will contract in length and expand in size when inflated, and thereby clamp or grip the rim.

Changes in the form, proportion, and the minor details of construction may be resorted to without departing from the principle or sacrificing any of the advantages of this invention.

What I claim is—

The combination with a rim, of an outer tube having its longitudinal edges arranged on the rim and provided at intervals with eyelets, and a series of transverse plates arranged on the rim and provided at their inner faces with fastening devices for engaging the rim and having at their outer faces studs engaging the eyelets, substantially as described.

In testimony that I claim the foregoing as my own I have hereto affixed my signature in the presence of two witnesses.

HUGH L. WARNER.

Witnesses:
GRAFTON W. REED,
THOMAS REED.